March 13, 1934.    A. MURRAY    1,950,903
CONTROLLED REDUCTION OF PHOTOGRAPHIC IMAGES
Filed June 27, 1929    2 Sheets-Sheet 2

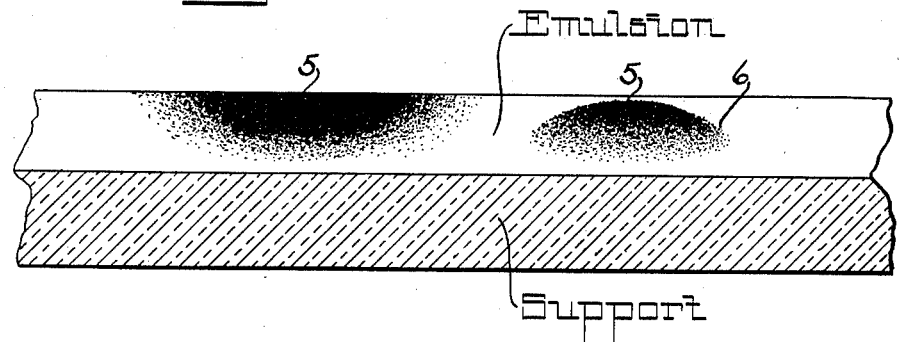
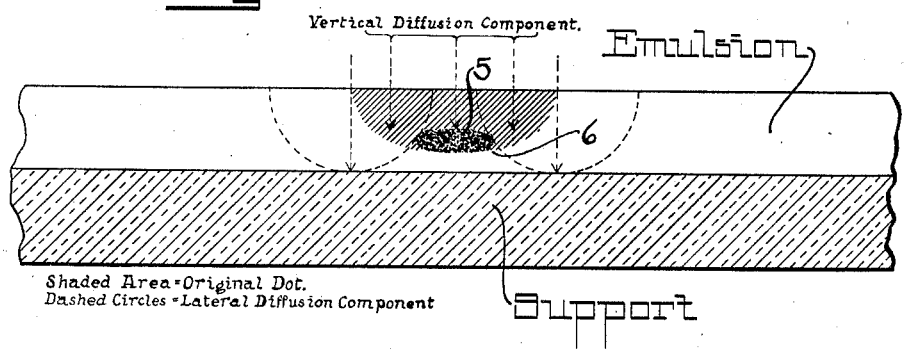
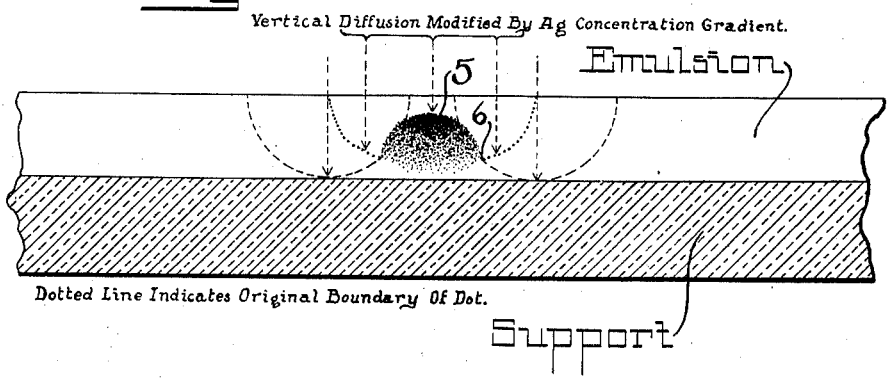

Inventor
Alexander Murray
By Newton M. Pennis
Attorney

Patented Mar. 13, 1934

1,950,903

UNITED STATES PATENT OFFICE 1,950,903

CONTROLLED REDUCTION OF PHOTO-GRAPHIC IMAGES

Alexander Murray, Rochester, N. Y., assignor to Eastman Kodak Company, Rochester, N. Y., a corporation of New York Application June 27, 1929, Serial No. 374,238

8 Claims. (Cl. 95—88)

This invention relates to staging or the chemical reduction of photographic screen negatives and positives, particularly those broken up with a screen.

It has long been recognized by photolithographers that if they could accomplish the peripheral reduction of screen dots of half-tone negatives or positives, their art would be enriched by a process hitherto confined to copper relief etching such as is employed in photoengraving. The need for such a process in this art has been particularly acute in the making of color corrections, since the common procedure for color correcting in lithography comprises staining the negative and manually retouching a continuous tone wet collodion positive supported on ground glass. This process, which represents the best practice, is inadequate since the details of the reproduction are not clear cut so that the outlines appear blurred upon retouching and the texture of the original is lost.

In accordance with the present invention a process is provided whereby retouching and particularly the peripheral reduction of screen dots on half-tone screen negatives and positives is effected under complete control and to any desired extent. The various features of the invention will appear from the detailed description and claims.

Figure 4:
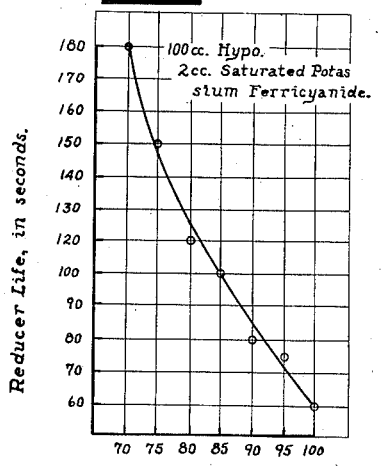

In the drawings Fig. 1 is a microscopic view in cross section of a film showing a dot which has not been reduced and also showing another dot after partial reduction; Figs. 2 and 3 are diagrammatic showings in enlarged cross section of the dot structure in a film after reduction; Fig. 4 is a chart showing the effect of dilution on the effective reducing action of the reducer, referred to herein as "reducer life"; and Figs. 5, 6, 7, 8, 9 and 10 represent photo-micrographs of successive stages of dot reduction.

By a series of experiments I have discovered the conditions surrounding the most favorable action of the reducer in half-tone dot reduction and the manner in which the reducer should be applied to a half-tone. For maximum efficiency the dot on the positive must be dense and must be deep, which condition is realized in a fully exposed or over-exposed screen positive made under normal conditions at correct screen distance from a continuous tone negative transparency. I have found that the action of the reducing agent is more effective along the horizontal radius of the dot 5 than on the vertical axis when the positive is viewed from above as shown in Figs. 2 and 3. Hence the edge 6 of the dot gets sharper as reduction proceeds so that while the thickness is slowly being reduced the relative density of the dot really increases. Even when the dot consists of a quite diffuse deposit, the reducer will cut it down to a mere point representing the original center.

This appears to be explicable on the basis of chemical mass action and diffusion, since, when the reducing agent acts on a dry plate, peripheral solution does not begin until after a considerable lapse of time of the order of forty seconds. However, when the reducing agent is poured on a hydrated plate the reduction of the dot begins almost immediately. This suggests the hypothesis that the lateral diffusion of the reducing agent which has been absorbed by the clear gelatin between the dots is an important component of the action. This is further confirmed by the fact that the peripheral action cannot be arrested for almost a minute even if the surface of the plate is being vigorously flushed with running water. It also appears that the reducing agent does not penetrate into the interior of the silver deposit but dissolves the silver only at the boundaries of the dot since it seems unable to penetrate gelatin in the presence of silver. Hence, the limit of reducing action at any given moment is represented by a sharply defined interface on one side of which is unattacked silver and on the other silver-free gelatin. According to this hypothesis the rate of penetration in the presence of the silver image would be a function of the silver concentration.

Ballard and Sheppard in a paper published in the Photographic Journal of August, 1928 on "The covering power of photographic deposits" have shown that especially under conditions of over-exposure and under-development the silver concentration gradient is markedly steeper than the photometric density gradient.

I have found that with the composition of the reducer constant, there is a great difference in the rate of reduction depending on whether the positive is tanned, untanned, dry, hydrated, or permeated with hypo. However, when reduction is carried to the same point under either of these various conditions mentioned, there is no marked difference in the dot structure. Even when the concentration and ratio of chemicals in the reducer is varied within wide limits but the reduction is carried to the same point by staging, there is no marked difference in the resulting dot structure. The final dot structure is then practically speaking determined by the original dot structure and this optimal original dot structure results from the normal and customary correlation of screen distance, camera extension, lens aperture, and screen opening.

Within the range of hypo-ferricyanide ratios used in this investigation I have further learned that the life of the potassium ferricyanide is little influenced by the relation of hypo to ferricyanide but is a function of the hydration of the solution. This effect of hydration on the action of the reducing agent has hitherto passed unnoticed by workers in this art. I have found that the life of the reducing agent is only lengthened about five seconds when the potassium ferricyanide is increased from one part to five parts and also that the life of the solution in the gelatin film is the same as outside the film. I have further discovered that the life of the reducer may be controlled by the degree of dilution of the hypo; for example if the dilution of the hypo is increased the life of the solution also increases and the quantity of silver removed increases without the ferricyanide content having been increased, a condition best indicated by the graph of Fig. 4. Thus under any given condition of hydration the solution of the silver increases with the ferricyanide content.

From these facts it may be stated that the degree of hydration of the gelatin is important in controlling the reducing action. Thus, if the hypo concentration increases, a zone is reached in which a condition of hydration equilibrium between the gelatin and reducer finds the gelatin only partly hydrated. The less the hydration the slower the solvent action due to the curtailment of diffusion. The effect of this is that if the positive plate is pre-hydrated before reduction by soaking in hypo, the amount of reduction obtained will be influenced by the concentration of the hypo used for hydrating.

Figure 5:
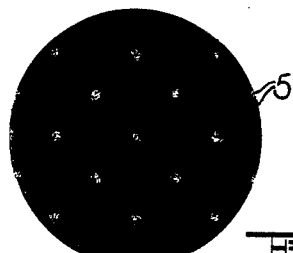
Figure 6:
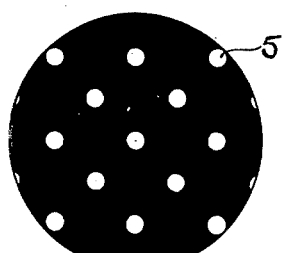
Figure 7:
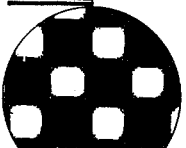
Figure 8:
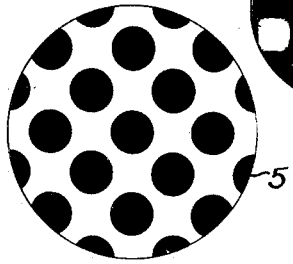
Figure 9:
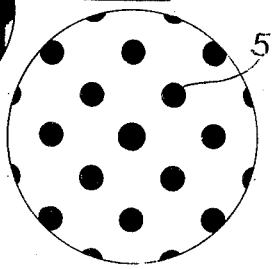
Figure 10:
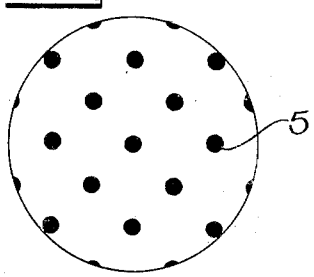

From the above discoveries I have developed the process of the present invention whereby complete control over the dot reducing action in a half-tone is effected by dissolution of the dots just as far or just as little as is desired in one stage. This makes it possible to accomplish rapid staging with the knowledge that the action will be completed in a predetermined time interval. According to a typical procedure a photographic negative of the desired subject is made following the well-known practice. From this negative a positive is made through a half-tone screen. This positive should be rather over-exposed so that the shadow dots are somewhat fogged which tone effect is used for the solid portion of the reproduction. The positive thus exposed is developed in the well-known hydroquinone caustic soda process developer for about two minutes at 65° F., rinsed, fixed and washed. It is thereupon taken from the wash water, and tanned for example by soaking in a 5% solution of potassium dichromate for 60 seconds after which it is carefully washed to remove the excess tanning agent and then dried. This tanning operation results in the saving of time in the latter stages of the process since it is necessary to dry the positive between each stage of the reduction of the dots and the tanned positive can be mopped with a piece of cloth so that it may be dried very rapidly in a current of warm air. The portions of the positive which it is desired to reproduce or print as a solid tone are painted over or coated with a suitable resist such as a thick coating of shellac or any other waterproof material whereupon the positive is ready for the first stage or reduction, at which time the dots 5 have the appearance represented in Fig. 5. If it is assumed that the positive plate is 8 inches by 10 inches a solution of 85 cc. of 35° Bé. hypo and 15 cc. of water is poured on the plate in the tray and permitted to remain there for one minute. If it is desired to obtain a 60 second etch, the positive plate is taken out of the solution, 5 cc. of saturated ferricyanide is poured into the hypo solution and an interval of forty seconds allowed to elapse after which the plate is put into the solution. The forty second interval is permitted to elapse since it is desired to obtain a 60 second etch and the total life of the solution is 100 seconds. As soon as the yellow color disappears, indicating the end of the reducing action, the plate is taken out of the solution and thoroughly washed for three minutes, otherwise a dichroic stain is produced by the formation of colloidal sulphur. The plate is then mopped dry with a cloth and finally dried in a warm current of air after which the dots will have the appearance of those represented at 5 in Fig. 6. The positive plate may then have other portions painted with the resist over the dots which it is desired to preserve and the remaining steps of the process repeated to effect another stage of reduction. The dot reduction from Fig. 6 to Fig. 7 represents three stages of 100 seconds each. The dot reduction from Fig. 7 to Fig. 8 represents two stages of 100 seconds etch each; from Fig. 8 to Fig. 9 represents two stages of 100 seconds etch, while from Fig. 9 to Fig. 10 represents one stage of 100 seconds etch.

The proportions of the reducing solution for various periods of reducer life are given in the following table:

100 parts by vol. 35° Bé. hypo plus 2 parts saturated (30%) potassium ferricyanide reducer life 60 seconds.

95 parts 35° hypo plus 2 parts ferricyanide reducer life 75 seconds.

85 parts 35° hypo plus 2 parts ferricyanide reducer life 100 seconds.

80 parts 35° hypo plus 2 parts ferricyanide reducer life 120 seconds.

75 parts 35° hypo plus 2 parts ferricyanide reducer life 150 seconds.

70 parts 35° hypo plus 2 parts ferricyanide reducer life 180 seconds.

(35° Bé. hypo is equivalent to 33.00% anhydrous hypo and 53.34% crystal hypo, that is $Na_2S_2O_3.5H_2O$).

Temperature should be 65° F.

The effect of these various proportions is shown in Fig. 4. It is understood that, as indicated at the top of this diagram, the indicated number of parts of hypo is brought up by addition of water to 100 and to this is added two parts of potassium ferricyanide solution. The abscissæ shows the final concentration of hypo and it is to be noted that the more dilute this is the longer the period.

As a slight variation of the above process, after the positive plate is tanned and washed, it may be soaked in water for five minutes, then mopped with a cloth and treated with the reducer. The time will be 100 seconds plus an interval which depends on the amount of water carried by the plate. When the plate is thus soaked in water, it may be treated with a hypo solution to control the degree of hydration after which it is treated with the reducing agent.

When the general staging of the half-tone has been effected by one or more successive reductions, it may be necessary to "re-etch" details, modify high lights, etc., in a free manner so that flat staging may be reduced to a minimum number of steps and confined to broad general reduction tones. For accomplishing this result the following steps have been developed. The screen positive, tanned as above described, is partially hydrated in 35° Bé. hypo, then the hypo is wiped off with a cloth. Chemically pure glycerine is rubbed evenly over the surface of the dots with a lintless cloth and all excess thereof is wiped off. A reducing solution comprising 20 cc. of glycerine, 20 cc. of water and 5 cc. of saturated potassium ferricyanide is then applied with a brush to the parts which it is desired to be etched. For full reducing action the brush is used wet while for less action the brush is touched to a rag to absorb the excess of the solution. However, for minimal action the brush is squeezed in a rag removing most of the solution. The extent of "cutting" is controlled by the number of times the brush is drawn over the area and by the quantity of solution in the brush. The procedure just outlined is very sensitive technique, extremely economical in use of materials and in conjunction with the flat staging previously described forms a process of very broad adaptability.

The procedure outlined above is given merely by way of example, but it will be understood that similar methods may be applied to staging and "control" on continuous tone plates, such as for special effects in commercial work or portraiture, within the scope of the claims without departing from the spirit of the present invention.

What I claim is:

1. A stage in the process of reduction of a photographic record which comprises impregnating the record with strong hypo solution, applying glycerine uniformly over the surface of the record, and then subjecting the surface of the record thus treated to a reducing solution comprising glycerine, water and potassium ferricyanide.

2. A stage in the process of reduction of a photographic record which comprises impregnating the record with strong hypo solution, applying gylcerine uniformly over the structure of the record and then subjecting the surface of the record thus treated to a reducing solution comprising 20 cc. of glycerine, 20 cc. of water and 5 cc. of saturated potassium ferricyanide solution.

3. The process of reduction of a half-tone photographic record which comprises preparing a screened plate, tanning the surface, applying to the tanned surface a reducing agent of known reducing activity per given time interval, washing the surface thereof, impregnating with hypo, applying chemically pure glycerine uniformly to the surface thereof and then etching the surface with a solution comprising glycerine, water and potassium ferricyanide.

4. In a process for reducing to a controlled extent a photomechanical record comprising a colloid layer containing dots composed of silver particles, the steps compounding a solution containing sodium thiosulfate of a selected degree of high concentration and also potassium ferricyanide of definite concentration and, at a definite time interval after such compounding, submitting the record to such solution until the reducing action of the solution is exhausted, the time interval being so selected that the extent of the action will produce the desired reduction.

5. In a process for reducing to a controlled extent a photomechanical record comprising a colloid layer containing dots composed of silver particles, the steps of submitting the record to solution of sodium thiosulfate of high concentration and then to a solution of sodium thiosulfate of a definitely selected degree of high concentration and of potassium of ferricyanide of definite concentration, the concentration in the second solution being selected in accordance with the desired reduction.

6. In a process for reducing to a controlled extent a photomechanical record comprising a colloid layer containing dots composed of silver particles, the steps of submitting the record to solution of sodium thiosulphate of high concentration and then to a solution of sodium thiosulfate of a definitely selected degree of high concentration and of potassium of ferricyanide of definite concentration, the concentration in the second solution being selected in accordance with the desired reduction and the record being submitted to the second solution from a definite time interval after the elements thereof are combined until the active life of the solution becomes exhausted.

7. In a process for reducing to a controlled extent a photomechanical record comprising a colloid layer containing dots composed of silver particles, the steps of submitting the record to a solution of sodium thiosulfate of a selected degree of high concentration and then submitting it to a solution containing sodium thiosulphate of the same degree of concentration and also potassium ferricyanide of definite concentration, the concentrations in each case being selected in accordance with the desired reduction characteristics.

8. In a process for reducing to a controlled extent a photomechanical record comprising a colloid layer containing dots composed of silver particles, the steps of submitting the record to a solution of sodium thiosulphate of a selected degree of high concentration and then submitting it to a solution containing sodium thiosulphate of the same degree of concentration and also potassium ferricyanide of definite concentration, the concentrations in each case being selected in accordance with the desired reduction characteristics and the record being submitted to the second solution from a definite time interval after the elements thereof are combined until the active life of the solution becomes exhausted, whereby the reducing action of the second solution is definitely controlled.

ALEXANDER MURRAY.